(12) United States Patent
Borne et al.

(10) Patent No.: US 6,474,639 B1
(45) Date of Patent: Nov. 5, 2002

(54) SNAP FIT BEARING ASSEMBLY

(75) Inventors: Ronald G. Borne, Rochester, NY (US); Carlie A. Cuff, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/972,644

(22) Filed: Oct. 9, 2001

(51) Int. Cl.[7] .................................................. B65H 5/02
(52) U.S. Cl. ........................ 271/272; 384/119; 198/835; 193/35 R
(58) Field of Search .................................. 271/272, 264; 384/119, 124, 191.4, 202, 539, 223, 489; 198/835; 193/35 R, 37

(56) References Cited

U.S. PATENT DOCUMENTS

| | | | | |
|---|---|---|---|---|
| 4,231,674 A | * | 11/1980 | Smith | 403/233 |
| 4,311,065 A | * | 1/1982 | DeBoo et al. | 74/117 |
| 4,831,921 A | * | 5/1989 | Potter | 384/539 |
| 5,511,885 A | | 4/1996 | Coleman | 384/439 |
| 6,024,497 A | | 2/2000 | Leibman | 384/428 |

FOREIGN PATENT DOCUMENTS

| | | | | |
|---|---|---|---|---|
| JP | 57-6119 | * | 1/1982 | F16C/9/04 |
| JP | 5-172150 | * | 7/1993 | F16C/27/00 |

* cited by examiner

*Primary Examiner*—Donald P. Walsh
*Assistant Examiner*—Kenneth W Bower
(74) *Attorney, Agent, or Firm*—Tallam I. Nguti

(57) ABSTRACT

A snap fit bearing assembly is provided for supporting a rotatable shaft in a wall of a machine. The snap fit bearing assembly includes a support wall portion, of the machine, having a first surface, a wall thickness and a second and opposite surface; a central opening through the support wall portion; a bearing receiving recess formed from the first surface partially into the wall; plural receiving openings formed through the wall thickness and spaced from the central opening; a bearing device having an inner bore and an external surface for inserting into the bearing receiving recess; and an adjustable force applying spring clip for applying a desired normal force to the bearing device. The adjustable force applying spring clip includes a chest portion for contacting the bearing device; resilient shoulder portions bent towards a back surface of the chest portion and connected one to each of first and second edges of the chest portion; and first and second hand portions connected one to each of the first and second resilient shoulder portions, and bent forwardly from the first and second resilient shoulder portions for snapping into a first and a second receiving openings of the plural receiving openings through the wall thickness of the support wall portion.

10 Claims, 3 Drawing Sheets

SNAP FIT BEARING ASSEMBLY

BACKGROUND OF THE INVENTION

The present invention relates to bearing assemblies, and more particularly to a snap fit bearing assembly including a snap fit device for mounting a securable and removable bearing of a rotatable member to a wall of a machine, such as a wall of an electrostatographic reproduction machine.

Electrophotographic or electrostatographic marking is a well-known, commonly used method of copying or printing documents. Electrophotographic marking is performed by exposing a charged photoreceptor with a light image representation of a desired document. The photoreceptor is discharged in response to that light image, creating an electrostatic latent image of the desired document on the photoreceptor's surface. Toner particles are then deposited onto that latent image, forming a toner image, which is then transferred onto a substrate, such as a sheet of paper. The transferred toner image is then fused to the substrate, usually using heat and/or pressure, thereby creating a permanent record of the original representation. The surface of the photoreceptor is then cleaned of residual developing material and recharged in preparation for the production of other images. Other marking technologies, for example, electrostatographic marking and ionography are also well-known.

An electrophotographic marking machine generally includes bearings for supporting and connecting parts, for example, a shaft. While such bearings are generally successful, fastening of the bearing to a member may be time consuming and costly. Bearings may add to the cost of the machine. Further, the bearing may wear or fail and cause inefficient operation of the machine. In addition, manufacturing time is required to install the bearings and to connect the components to the bearings during assembly of the machine.

Also, to conserve natural resources and provide for a machine with improved features and more reliable newer technology, machinery is often remanufactured and disassembled. Furthermore, the removal of the bearings represents a cost associated with remanufacturing of the machines. The time required to remove bearings may be a significant remanufacturing cost factor. Components have typically been joined together with the use of bearings in the form of welding, rivets or screws. Rivets require the use of special machinery to assemble, may become loose and rattle during use and are difficult and expensive to remove for remanufacturing. Screws have disadvantages in that they require a substantial amount of assembly time, may become loose during use, and may become very time consuming to remove. Therefore, a bearing that may be easily manufactured and that is removeably securable to a surface for use with other parts would be beneficial.

Moreover, it has been increasingly important to develop lighter materials for the framework of the machines. Accordingly, many modem machines utilize a fabricated sheet metal or plastic frame resulting in relatively thin walled support structures. Throughout a typical printing machine, there are many shafts utilized to support idler rollers, drive rollers. It is therefore desirable to provide a bearing which can be utilized in a wall while still providing generally high durability.

Reference is made for example to U.S. Pat. No. 6,024,497 (Liebman) which relates to a bushing mountable in a housing for supporting a rotating member and for providing a bias force to the rotating member. The bushing includes a body defining an aperture therein and a mounting member for mounting the bushing to the housing. The bushing also includes a biasing member operably associated with said body and said mounting member.

U.S. Pat. No. 5,511,885 (Coleman) relates to a plain flanged bearing or bushing for supporting a rotating shaft in a thin walled frame of an electrophotographic printing machine. The composite bearing has a flanged end and is adapted to be inserted in an opening in a thin walled support member until the flange abuts the surface of the wall. A protruding tab formed by displacing a small portion of the flange extends in an axial direction along the bearing and cooperates with a corresponding opening in the wall to prevent rotation of the bearing. A friction push nut or snap ring is attached to the bearing on the side of the wall opposite the flange. The protruding tab prevents the bearing from rotating about an axis which can cause the bearing to be worn on the exterior surface by rotational contact with the thin wall. A shaft to support idler rolls or other rotating elements is inserted in an inner bore of the bearing and is rotatably supported thereby.

SUMMARY OF THE INVENTION

In accordance with one aspect of the present invention, there is provided, a snap fit bearing assembly for supporting a rotatable shaft in a wall of a machine. The snap fit bearing assembly includes a support wall portion, of the machine, having a first surface, a wall thickness and a second and opposite surface; a central opening through the support wall portion; a bearing receiving recess formed from the first surface partially into the wall; plural receiving openings formed through the wall thickness and spaced from the central opening; a bearing device having an inner bore and an external surface for inserting into the bearing receiving recess; and an adjustable force applying spring clip for applying a desired normal force to the bearing device. The adjustable force applying spring clip includes a chest portion for contacting the bearing device; resilient shoulder portions bent towards a back surface of the chest portion and connected one to each of first and second edges of the chest portion; and first and second hand portions connected one to each of the first and second resilient shoulder portions, and bent forwardly from the first and second resilient shoulder portions for snapping into a first and a second receiving openings of the plural receiving openings through the wall thickness of the support wall portion.

BRIEF DESCRIPTION OF THE DRAWINGS

In the detailed description of the invention presented below, reference is made to drawings in which.

DETAILED DESCRIPTION OF THE INVENTION

While the principles of the present invention will be described in connection with an electrostatographic reproduction machine, it should be understood that the present invention is not limited to that embodiment or to that application. Therefore, it is should be understood that the principles of the present invention extend to all alternatives, modifications and equivalents as may be included within the spirit and scope of the appended claims.

The present invention relates to embodiments of a bearing assembly for use in walls of reproduction machines. Although the bearing assembly of the present invention is particularly well adapted for use in the illustrative printing machine, it will become evident that the bearing assembly is equally well suited for use in a wide variety of machines and are not necessarily limited in its application to the particular embodiment shown herein.

Figure 5:
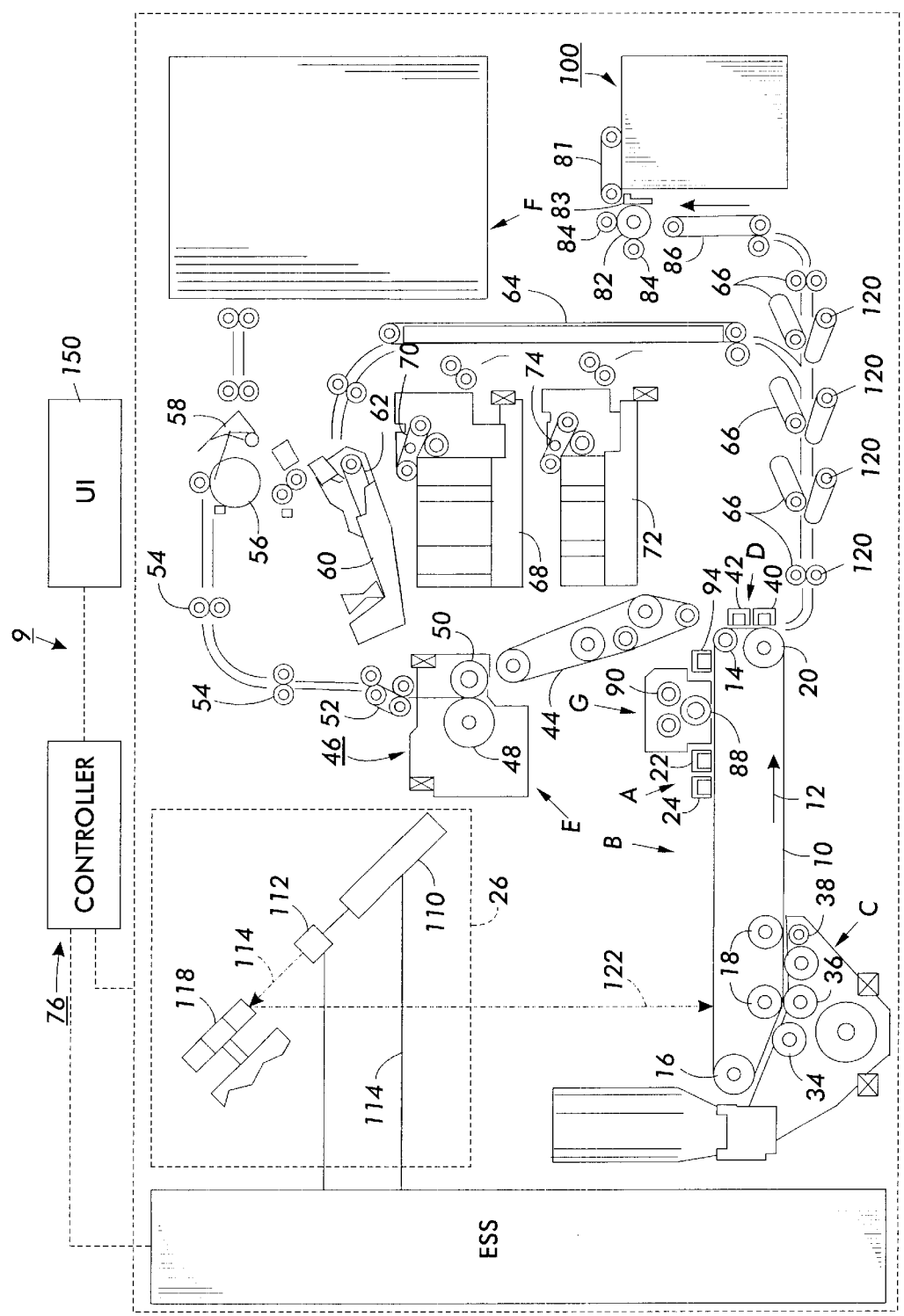
FIG. 5 is a schematic elevational view of an electrophotographic printing machine utilizing the present invention.

Referring to FIG. 5 of the drawings, an illustrative reproduction machine incorporating the bearing assembly of the present invention is shown. The reproduction machine employs a photoconductive belt 10. Belt 10 moves in the direction of arrow 12 to advance successive portions sequentially through the various processing stations disposed about the path of movement thereof. Belt 10 is entrained about stripping roller 14, tensioning roller 16, idler roll 18 and drive roller 20. As roller 20 rotates, it advances belt 10 in the direction of arrow 12.

Initially, a portion of the photoconductive surface passes through charging station A. At charging station A, two corona generating devices indicated generally by the reference numerals 22 and 24 charge the photoconductive belt 10 to a relatively high, substantially uniform potential.

Next, the charged portion of the photoconductive surface is advanced through imaging station B. At the imaging station, an imaging module indicated generally by the reference numeral 26, records an electrostatic latent image on the photoconductive surface of the belt 10. Imaging module 26 includes a raster output scanner (ROS). The ROS lays out the electrostatic latent image in a series of horizontal scan lines with each line having a specified number of pixels per inch. Other types of imaging systems may also be used employing, for example, a pivoting or shiftable LED write bar or projection LCD (liquid crystal display) or other electro-optic display as the "write" source.

The imaging module 26 (ROS) includes a laser 110 for generating a collimated beam of monochromatic radiation 122, an electronic subsystem (ESS) associated with the machine electronic printing controller 76 transmits a set of signals via 114 corresponding to a series of pixels to the laser 110 and/or modulator 112, a modulator and beam shaping optics unit 112, which modulates the beam 122 in accordance with the image information received from the ESS, and a rotatable polygon 118 having mirror facets for sweep deflecting the beam 122 into raster scan lines which sequentially expose the surface of the belt 10 at imaging station B. A user interface (UI) 150 is associated with the controller 76.

Thereafter, belt 10 advances the electrostatic latent image recorded thereon to development station C. Development station C has three magnetic brush developer rolls indicated generally by the reference numerals 34, 36 and 38. A paddle wheel picks up developer material and delivers it to the developer rolls. When the developer material reaches rolls 34 and 36, it is magnetically split between the rolls with half of the developer material being delivered to each roll. Photoconductive belt 10 is partially wrapped about rolls 34 and 36 to form extended development zones. Developer roll 38 is a clean-up roll. The latent image attracts toner particles from the carrier granules of the developer material to form a toner powder image on the photoconductive surface of belt 10. Belt 10 then advances the toner powder image to transfer station D.

At transfer station D, a copy sheet is moved into contact with the toner powder image. First, photoconductive belt 10 is exposed to a pretransfer light from a lamp (not shown) to reduce the attraction between photoconductive belt 10 and the toner powder image. Next, a corona, generating device 40 charges the copy sheet to the proper magnitude and polarity so that the copy sheet is tacked to photoconductive belt 10 and the toner powder image is attracted from the photoconductive belt to the copy sheet. After transfer, corona generator 42 charges the copy sheet to the opposite polarity to detack the copy sheet from belt 10. Conveyor 44 then advances the copy sheet to fusing station E.

Fusing station E includes a fuser assembly 46 which permanently affixes the transferred toner powder image to the copy sheet. Preferably, fuser assembly 46 includes a heated fuser roller 48 and a pressure roller 50 with the powder image on the copy sheet contacting fuser roller 48. The pressure roller is cammed against the fuser roller to provide the necessary pressure to fix the toner powder image to the copy sheet. The fuser roll 48 is internally heated by a quartz lamp. Release agent, stored in a reservoir, is pumped to a metering roll. A trim blade trims off the excess release agent. The release agent transfers to a donor roll and then to the fuser roll.

After fusing, the copy sheets are fed through a decurler 52. Decurler 52 bends the copy sheet in one direction to put a known curl in the copy sheet and then bends it in the opposite direction to remove that curl.

Forwarding rollers 54 then advance the sheet to duplex turn roll 56. Duplex solenoid gate 58 guides the sheet to the finishing station F, or to duplex tray 60. At finishing station F, copy sheets are stacked in a compiler tray and attached to one another to form sets. When duplex solenoid gate 58 diverts the sheet into duplex tray 60. Duplex tray 60 provides an intermediate or buffer storage for those sheets that have been printed on one side and on which an image will be subsequently printed on the second, opposite side thereof, i.e., the sheets being duplexed. The sheets are stacked in duplex tray 60 facedown on top of one another in the order in which they are copied.

To complete duplex copying, the simplex sheets in tray 60 are fed, in seriatim, by bottom feeder 62 from tray 60 back to transfer station D via conveyor 64 and rollers 66 for transfer of the toner powder image to the opposed sides of the copy sheets. Inasmuch as successive bottom sheets are fed from duplex tray 60, the proper or clean side of the copy sheet is positioned in contact with belt 10 at transfer station D so that the toner powder image is transferred thereto. The duplex sheet is then fed through the same path as the simplex sheet to be advanced to finishing station F.

The high capacity variable sheet size sheet feeder 100 is the primary source of copy sheets. Feed belt 81 feeds successive uppermost sheets from the stack to a take-away drive roll 82 and idler rolls 84. The drive roll and idler rolls guide the sheet onto transport 86. Transport 86 advances the sheet to rolls 66 which, in turn, move the sheet to transfer station D.

Secondary tray 68 and auxiliary tray 72 are secondary sources of copy sheets. Copy sheets are fed to transfer station D from the secondary tray 68 or auxiliary tray 72. Sheet feeders 70, 74 are friction retard feeders utilizing feed belts and take-away rolls to advance successive copy sheets to transport 64 which advances the sheets to rolls 66 and then to transfer station D. The copy sheet is registered just prior to entering transfer station D so that the sheet is aligned to receive the developed image thereon.

Invariably, after the copy sheet is separated from the photoconductive belt 10, some residual particles remain adhering thereto. After transfer, photoconductive belt 10 passes beneath corona generating device 94 which charges the residual toner particles to the proper polarity. Thereafter, the pre-charge erase lamp (not shown), located inside photoconductive belt 10, discharges the photoconductive belt in preparation for the next charging cycle. Residual particles are removed from the photoconductive surface at cleaning station G. Cleaning station G includes an electrically biased cleaner brush 88 and two de-toning rolls 90.

The various machine functions are regulated by a controller 76. The controller 76 is preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

Throughout each of the operating stations of the machine as described above, bearings, and hence bearing assemblies as in accordance with the present invention, are in common use for supporting and connecting parts, for example rotatable shafts and members. In accordance with the present invention, to install each of such bearings, and to connect or fasten it during assembly to a portion of a machine frame or wall is made less time consuming and less costly. Ordinarily, the design of bearing assemblies requires that the outer and inner race of the bearing device therein be secured. This is typically accomplished either through the use a retaining ring or the use of press fits. A retaining ring requires additional hardware, and a press fit normally means or results in an inseparable assembly which is not good for assemblies intended for remanufacture.

Figure 1:
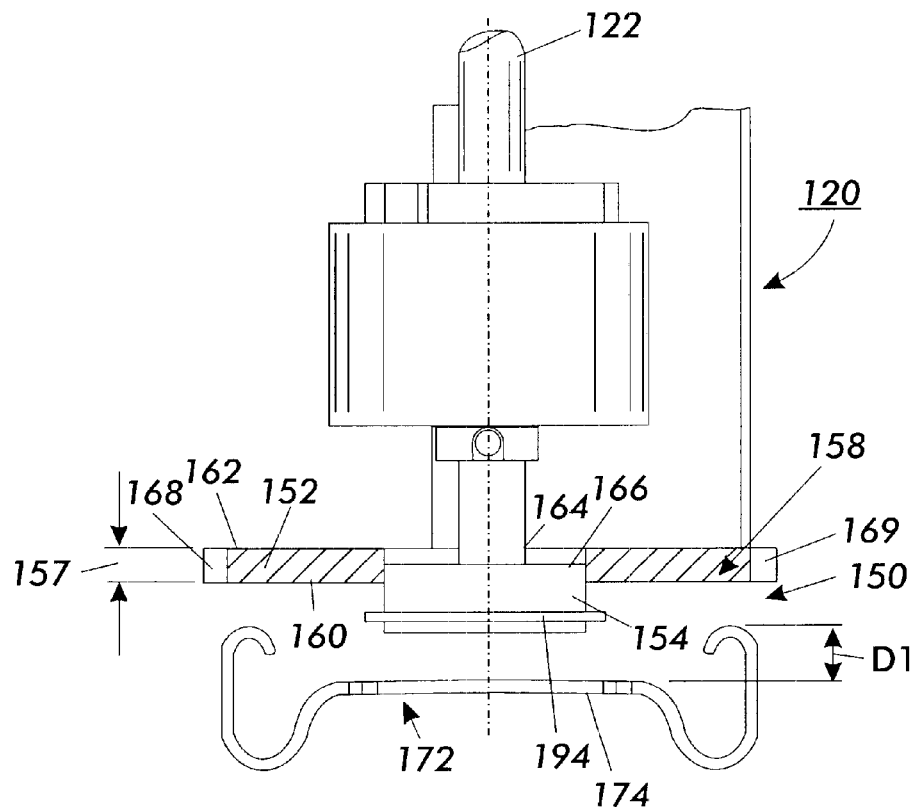
FIG. 1 illustrates a partial cut-away view of a portion of a machine such as an electrostatographic reproduction machine (FIG. 5) showing a snap fit bearing assembly about to be assembled in accordance with the present invention.
Figure 2:
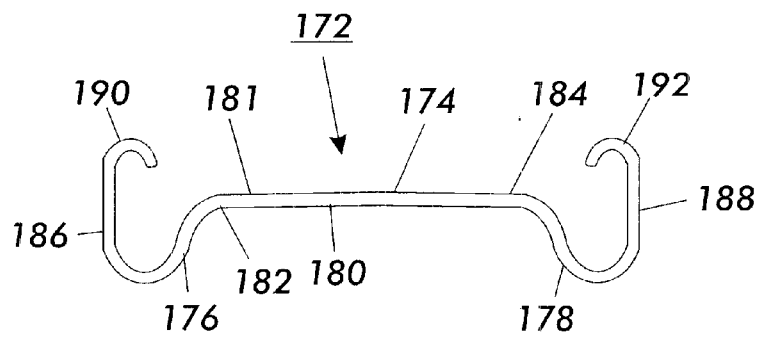
FIG. 2 illustrates a side view of the adjustable force applying spring clip of the bearing assembly of FIG. 1.
Figure 3:
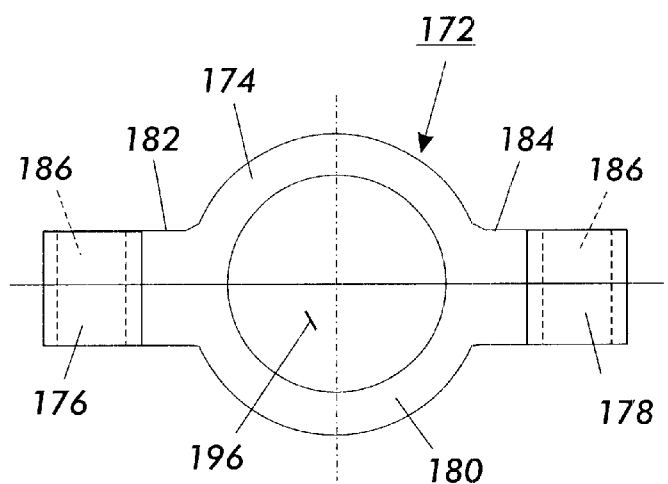
FIG. 3 illustrates a front view of the adjustable force applying spring clip of the bearing assembly of FIG. 1.
Figure 4:
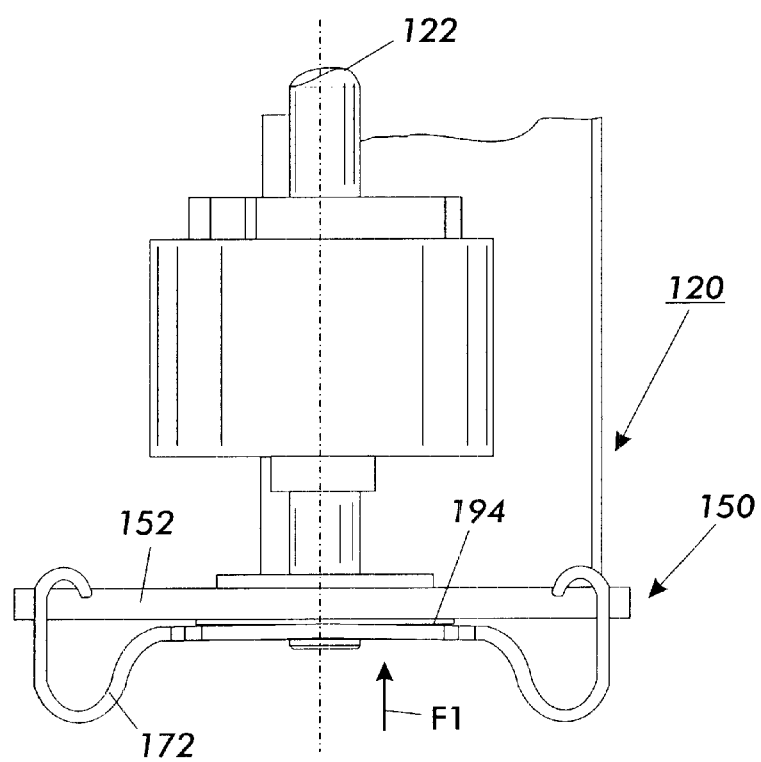
FIG. 4 illustrates the partial cut-away view of the portion of the machine of FIG. 1 showing the snap fit bearing assembly fully assembled therein in accordance with the present invention.

Turning now to FIGS. 1–4, a partial cut-away view of a rotatable component portion 120 of a machine, for example an electrostatographic reproduction machine 9, including a snap fit bearing assembly 150 about to be fully assembled in accordance with the present invention is illustrated in FIG. 1. The snap fit bearing assembly 150 is suitable for supporting a rotatable shaft 122 in a wall or frame 152 of a machine.

As shown, the snap fit bearing assembly 150 includes a support wall portion 158, of the machine, having a first surface 160, a wall thickness 157 and a second and opposite surface 162. The wall portion 158 also has a central opening 164 therethrough, a bearing receiving recess 166 formed from the first surface 160 partially into the wall thickness 157, and plural receiving openings including first and second such openings 168, 169 formed through the wall thickness 157 from the first surface 160 to the second surface 162, as well as spaced from the central opening 164.

The snap fit bearing assembly 150 also includes a bearing device 154 having an inner bore (not shown) for fitting over and end of the shaft 122, and an external surface for inserting into the bearing receiving recess 166. The snap fit bearing assembly 150 then includes an adjustable force applying spring clip 172 for mounting over and against the bearing device 154, and for applying a desired normal force F1 to the bearing device 154.

The adjustable force applying spring clip 172 as shown (FIGS. 1–4), includes a chest portion 174 for contacting an outer or back end of the bearing device 154. The spring clip 172 then includes resilient shoulder portions 176, 178 that are bent backwards towards a first or back surface 180 of the chest portion 174 and away from the first surface 160 of the wall portion 158. As shown, each of the shoulder portions 176, 178 is connected to one of first and second edges 182, 184 of the chest portion 174. Each the shoulder portion includes a curved shoulder-to-chest connecting portion having an adjustable radius of curvature.

First and second hand portions 186, 188 are then connected respectively to the first and second resilient shoulder portions 176, 178. The first and second hand portions 186, 188 are each bent forwardly from the first and second resilient shoulder portions 176, 178 towards the surface 160 of the wall portion 158 for snapping into a first and the second receiving openings 168, 169 of the plural receiving openings. Each the first and second resilient shoulder portions 176, 178 includes a curved shoulder-to-hand connecting portion having an adjustable radius of curvature. As further shown, each of the first and second hand portions 186, 188 includes a distal hook end 190, 192 for contacting and latching against the support wall portion 158 after snapping into and through the receiving openings 168, 169.

As shown, the rotatable component portion 120 of the machine 9 includes the wall or frame 152 and the rotatable shaft 122 that is about to be installed therein, and the bearing device 154 of the snap fit bearing assembly 150. As further shown, the snap fit bearing assembly 150 is inserted into the wall or frame 152 until a front surface 181 of the bearing device 154 contacts a bottom surface of the receiving recess 166.

The adjustable force applying spring clip 172 is used to hold the bearing device 154 of the bearing assembly 150 substantially secured within the receiving recess 166 while applying the normal force F1 against the surface 180 of the bearing device 154. As such, the adjustable force applying spring clip 172 physically impedes the bearing device 154 and the snap fit bearing assembly 150 as a whole, from rotating about its axis and from becoming unsecured from the wall or frame 152.

The shoulder portions 176, 178 and the hand portions 186, 188 are flexible and are thus stretchable (by changing the angle of their backward or forward curvature or bend) from an unextended free state to an extended state so as to allow the distal hook ends 190, 192 of the hand portions 186, 188 to snap fit through first and second receiving openings 168, 169 (from the first surface 160 to the second surface 162) in an extended or tensioned force applying state. In the unextended state, the distal hook ends 190, 192 are spaced from each other a distance less than a spacing between the first and the second receiving openings 168, 169 in the wall portion.

So to recap, the present invention is directed to a snap fit bearing assembly 150 for supporting a rotatable shaft 122 in a wall or frame 152 of a machine 9. The snap fit bearing assembly includes a support wall portion 158 of the wall or frame 152 of the machine. The support wall portion 158 has a first surface 160, a wall thickness 157, a second and opposite surface 162, a central opening 164 therethrough, a bearing receiving recess 166 formed from the first surface 160 partially into the wall thickness 157 plural receiving openings including first and second receiving openings 168, 169 formed through the wall thickness 157 and spaced from the central opening 164.

The snap fit bearing assembly also includes a bearing device 154 for inserting into the bearing receiving recess 166. The bearing device 154 has a cylindrical external surface, an inner bore (not shown) for fitting over the shaft 122 and an external surface. It also includes an adjustable force applying spring clip 172 for snapping into the receiving openings and applying a desired normal force F1 to the bearing device 154 when the bearing device 154 is inserted into the receiving recess.

The snap fit bearing assembly 150 further includes a retaining ring 194 for fitting over the external surface of the bearing device 154 and such as to lie between the first surface 160 of the support wall portion 158 and the front surface 181 of the chest portion 174 of the adjustable force applying spring clip 172. The chest portion 174 includes a retaining aperture 196 therethrough for fitting over the bearing device 154. As bent forwardly from the first and second resilient shoulder portions 176, 178, each of the first and second hand portions 186, 188 is spaced forwardly from the chest portion 174, a distance D1 that is less than the thickness 157 of the wall or frame 152, so as to cause the shoulder portions 176, 178 and the hand portions 186, 188 to be extended to allow the distal ends 190, 192 of the hand portions 186, 188 to snap fit through the first and second receiving openings 168, 169 as above.

As can be seen, there has been provided a snap fit bearing assembly for supporting a rotatable shaft in a wall of a machine. The snap fit bearing assembly includes a support wall portion, of the machine, having a first surface, a wall thickness and a second and opposite surface; a central opening through the support wall portion; a bearing receiving recess formed from the first surface partially into the wall; plural receiving openings formed through the wall thickness and spaced from the central opening; a bearing device having an inner bore and an external surface for inserting into the bearing receiving recess; and an adjustable force applying spring clip for applying a desired normal force to the bearing device. The adjustable force applying spring clip includes a chest portion for contacting the bearing device; resilient shoulder portions bent towards a back surface of the chest portion and connected one to each of first and second edges of the chest portion; and first and second hand portions connected one to each of the first and second resilient shoulder portions, and bent forwardly from the first and second resilient shoulder portions for snapping into a first and a second receiving openings of the plural receiving openings through the wall thickness of the support wall portion.

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A bearing assembly for supporting a rotatable shaft in a wall of a machine comprising:
  a. a support wall portion of the wall of the machine, said support wall portion having a first surface, a wall thickness and a second and opposite surface;
  b. a central opening through said support wall portion;
  c. a bearing receiving recess formed from said first surface partially into said wall thickness of said support wall portion;
  d. plural receiving openings formed through said wall thickness of said support wall portion and spaced from said central opening;
  e. a bearing device for inserting into said bearing receiving recess, said bearing device having an inner bore and an external surface; and
  f. an adjustable force applying spring clip for applying a desired normal force to said bearing device when said bearing device is inserted into said receiving recess, said adjustable force applying spring clip including:
    i. a chest portion for contacting said bearing device, said chest portion having a front surface and a back surface and first and second edges for contacting said bearing devices;
    ii. resilient shoulder portions connected one to each of said first and second edges respectively, each said first and second shoulder portion being bent towards said back surface of said chest portion; and
    iii. first and second hand portions connected one to each of said first and second resilient shoulder portions, each said first and second hand portions being bent forwardly from said first and second resilient shoulder portions respectively for snapping into a first and a second receiving openings of said plural receiving opening through said wall thickness of said support wall portion.

2. The bearing assembly of claim 1, including a retaining ring for fitting over said bearing device between said first surface of said support wall portion and said chest portion of said adjustable force applying spring clip.

3. The bearing assembly of claim 1, wherein said bearing device has a cylindrical external surface.

4. The bearing assembly of claim 1, wherein said chest portion includes a retaining aperture therethrough for fitting over said bearing device.

5. The bearing assembly of claim 1, wherein each said shoulder portion includes a curved shoulder-to-chest connecting portion having an adjustable radius of curvature.

6. The bearing assembly of claim 1, wherein each said first and second resilient shoulder portions includes a curved shoulder-to-hand connecting portion having an adjustable radius of curvature.

7. The bearing assembly of claim 1, wherein each said first and second hand portions includes a distal hook end for contacting and latching against said support wall portion.

8. The bearing assembly of claim 1, wherein as bent forwardly from said first and second resilient shoulder portions, each said first and second hand portions is spaced forwardly from said chest portion, a distance less than a thickness of said support wall portion.

9. The bearing assembly of claim 7, wherein said distal hook ends are spaced from each other a distance less than a spacing between said first and said second receiving openings in said wall portion.

10. An electrostatographic reproduction machine comprising:
  (a) subsystems including a movable image bearing member, imaging devices, and at least a development apparatus, for forming and transferring a toner image onto a copy sheet;
  (b) rotatable components within said subsystems for mounting and supporting rotatably in a bearing assembly; and
  (c) a bearing assembly for supporting each said rotatable component in a support wall portion of said machine, said bearing assembly including:
    i. a support wall portion of the wall of the machine, said support wall portion having a first surface, a wall thickness and a second and opposite surface;
    ii. a central opening through said support wall portion;

iii. a bearing receiving recess formed from said first surface partially into said wall thickness of said support wall portion;
iv. plural receiving openings formed through said wall thickness of said support wall portion and spaced from said central opening;
v. a bearing device for inserting into said bearing receiving recess, said bearing device having an inner bore and an external surface; and
vi. an adjustable force applying spring clip for applying a desired normal force to said bearing device when said bearing device is inserted into said receiving recess, said adjustable force applying spring clip including:
  a chest portion for contacting said bearing device, said chest portion having a front surface and a back surface and first and second edges for contacting said bearing devices;
  resilient shoulder portions connected one to each of said first and second edges respectively, each said first and second shoulder portion being bent towards said back surface of said chest portion; and
  first and second hand portions connected one to each of said first and second resilient shoulder portions, each said first and second hand portions being bent forwardly from said first and second resilient shoulder portions respectively for snapping into a first and a second receiving openings of said plural receiving opening through said wall thickness of said support wall portion.

* * * * *